United States Patent [19]

Lunk et al.

[11] Patent Number: 4,859,836
[45] Date of Patent: Aug. 22, 1989

[54] MELT-SHAPEABLE FLUOROPOLYMER COMPOSITIONS

[75] Inventors: Hans E. Lunk; Donald A. Reed, both of Menlo Park; Marguerite E. Deep, Los Altos; Charles Hill, Mountain View; Andrew Au, Union City, all of Calif.

[73] Assignee: Raychem Corporation, Menlo Park, Calif.

[21] Appl. No.: 896,549

[22] Filed: Aug. 14, 1986

Related U.S. Application Data

[60] Division of Ser. No. 720,119, Apr. 4, 1985, Pat. No. 4,624,990, which is a continuation-in-part of Ser. No. 539,871, Oct. 7, 1983, abandoned.

[51] Int. Cl.$^4$ ............................................. H05B 3/10
[52] U.S. Cl. ................................ 219/548; 338/22 R; 338/308; 338/309; 219/505; 219/552
[58] Field of Search ............... 338/22 R, 309, 308; 219/548, 505, 552

[56] References Cited

U.S. PATENT DOCUMENTS

| | | | |
|---|---|---|---|
| 3,291,864 | 12/1966 | Eldridge et al. | 260/900 |
| 3,838,030 | 9/1974 | Kagaya et al. | 525/359 S |
| 4,123,401 | 10/1978 | Berghmans et al. | 525/199 |
| 4,400,614 | 8/1983 | Sopory | 338/22 R |
| 4,427,877 | 1/1984 | Dhingra | 338/22 R |

FOREIGN PATENT DOCUMENTS

| | | |
|---|---|---|
| 1947556 | 9/1969 | Fed. Rep. of Germany . |
| 2939754 | 7/1980 | Fed. Rep. of Germany . |
| 70248 | 6/1976 | Japan ................................. 524/462 |
| 1255081 | 11/1971 | United Kingdom . |
| 1354471 | 5/1974 | United Kingdom . |

*Primary Examiner*—Jacob Ziegler
*Attorney, Agent, or Firm*—Marguerite E. Gerstner; Timothy H. P. Richardson; Herbert G. Burkard

[57] ABSTRACT

Melt-shapeable polymeric compositions comprising a first fluoropolymer of relatively low crystallinity, e.g. a copolymer of tetrafluoroethylene and a perfluorinated comonomer, and a second fluoropolymer of relatively high crystallinity, especially a fluoropolymer obtained by irradiating PTFE or another fluoropolymer which cannot be melt-shaped in the absence of other polymers. The weight ratio of the first to the second polymer is preferably 0.3:1 to 2.5:1. The compositions have a wide variety of uses, for example as insulating materials or, if they contain carbon black or another conductive filler, as PTC conductive polymers.

8 Claims, 1 Drawing Sheet

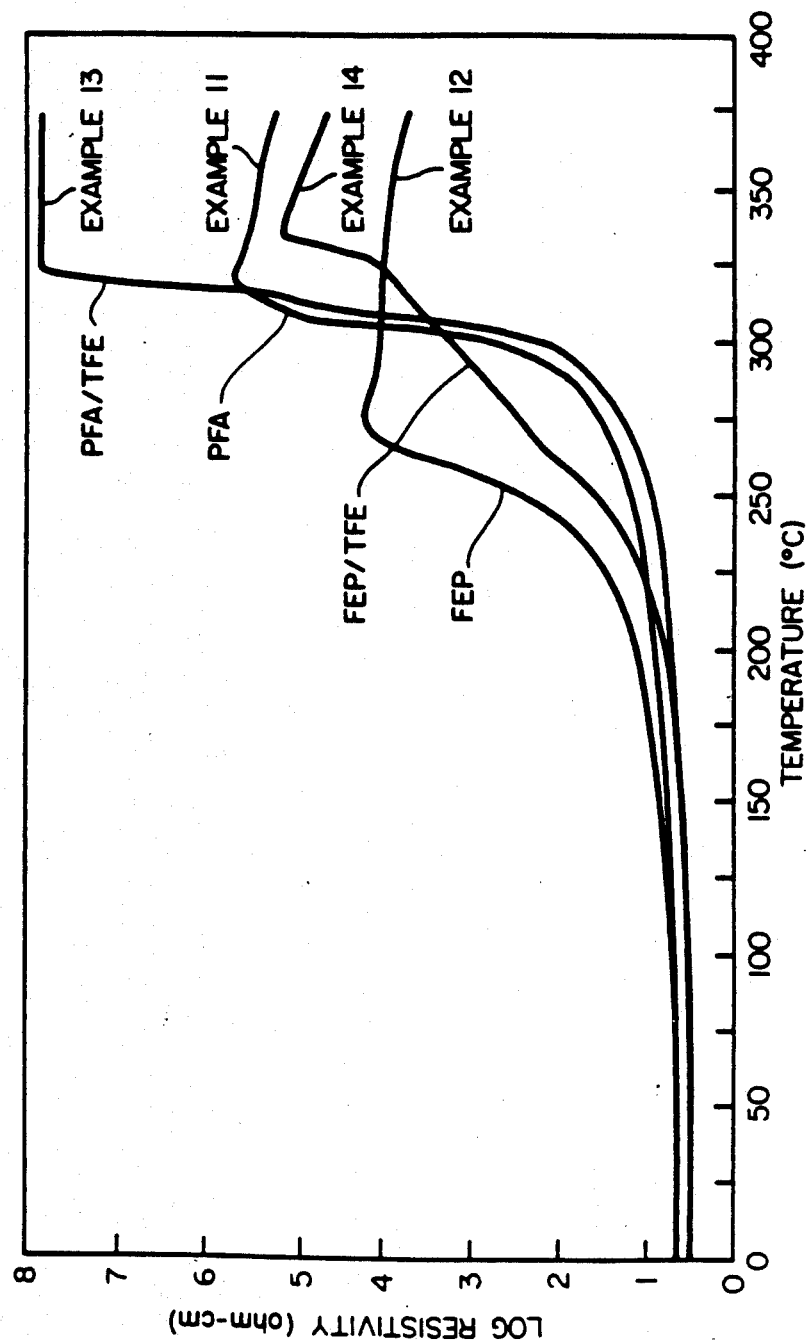
FIG_1

MELT-SHAPEABLE FLUOROPOLYMER COMPOSITIONS

CROSS REFERENCE TO RELATED APPLICATION

This application is a divisional of Application Ser. No. 720,119 filed Apr. 4, 1985, now U.S. Pat. No. 4,624,990, which is a continuation-in-part of Application Ser. No. 539,871, filed Oct. 7, 1983, now abandoned, by Lunk and Reed. The entire disclosure of those applications are incorporated herein by reference.

BACKGROUND OF THE INVENTION

1. Field of the Invention

This invention relates to polymeric compositions comprising fluoropolyers.

2. Introduction to the Invention

Fluoropolymers are well known and are useful in a broad range of applications. Some fluoropolymers can be melt-shaped, including for example polyvinylidene fluoride and copolymers of tetrafluoroethylene and ethylene, hexafluoropropylene, or a perfluorinated vinyl ether. These fluoropolymers have been used extensively for electrical insulation, particularly as melt-extruded jackets around conductors, and exhibit a valuable combination of physical and electrical properties. They have also been used in conductive polymer compositions which comprise the fluoropolymer and carbon black or another conductive filler dispersed therein. However, other fluoropolymers, in particular polytetrafluoroethylene (PTFE), which have very high crystallinity, also have such high molecular weights that they cannot be melt-shaped. This makes them difficult and expensive to process, and has severely restricted their use, despite the fact that in some respects they offer important advantages over the melt-shapeable fluoropolymers, in particular one or more of good elongation, high melting point and low loss tangent at high frequencies. Attempts have been made to produce similar polymers which retain these advantages but have relatively low molecular weights so that they can be melt-extruded. However, such polymers have such poor mechanical properties that they are of little practical value. For example, PTFE can be irradiated to produce a material which retains the crystallinity of the original polymer but has a relatively low molecular weight, but melt extrusion of this material results in products which are extremely brittle (see U.S. Pat. No. 3,838,030, Kagiya et al, the disclosure of which is incorporated herein by reference).

Conductive polymer compositions, including such compositions exhibiting PTC behavior, and electrical devices comprising them, are well known. Reference may be made, for example, to U.S. Pat. Nos. 2,952,761; 2,978,665; 3,243,753; 3,351,882; 3,571,777; 3,757,086; 3,793,716; 3,823,217; 3,858,144; 3,861,029; 3,950,604; 4,017,715; 4,072,848; 4,085,286; 4,117,312; 4,177,376; 4,177,446; 4,188,276; 4,237,441; 4,242,573; 4,246,468; 4,250,400; 4,252,692; 4,255,698; 4,271,350; 4,272,471; 4,304,987; 4,309,596; 4,309,597; 4,314,230; 4,314,231; 4,315,237; 4,317,027; 4,318,881; 4,327,351; 4,330,704; 4,334,351; 4,352,083; 4,388,607; 4,398,084; 4,413,301; 4,425,397; 4,426,339; 4,426,633; 4,427,877; 4,435,639; 4,429,216; 4,442,139; 4,459,473; 4,481,498; 4,473,450; and 4,502,929; J. Applied Polymer Science 19, 813–815 (1975), Klason and Kubat; Polymer Engineering and Science 18, 649–653 (1978), Narkis et al; and commonly assigned U.S. Ser. Nos. 601,424 now abandoned, published as German OLS No. 1,634,999; 732,792 (Van Konynenburg et al), now abandoned, published as German OLS No. 2,746,602; 798,154 (Horsma et al), now abandoned, published as German OLS No. 2,821,799; 134,354 (Lutz); 141,984 (Gotcher et al), published as European Application No. 38,718; 141,988 (Fouts et al), published as European Application No. 38,718,141,989 (Evans), published as European Application No. 38,713, 141,991 (Fouts et al), published as European Application No. 38,714, 150,909 (Sopory), published as UK Application No. 2,076,106A, 184,647 (Lutz), 250,491 (Jacobs et al) published as European Application No. 63,440, 272,854 and 403,203 (Stewart et al), published as European Patent Application No. 67,679, 274,010 (Walty et al), 300,709 and 423,589 (Van Konynenburg et al), published as European Application No. 74,281, 369,309 (Midgley et al), 483,633 (Wasley), 493,445 (Chazan et al), published as European Application No. 128,664, 606,033 (Leary et al), published as European Application No. 119,807, 509,897, 598,048, 603,485 and 618,109 (Masia et al), published as European Application No. 84304502.2, 524,482 (Tomlinson et al), published as European Application No. 84305584.9, 534,913 (McKinley), 535,449 (Cheng et al) published as European Application No. 84306456.9, 552,649 (Jensen et al), published as European Application No. 8407984.9, 573,099 (Batliwalla et al), 904,736, published as UK Patent Nos. 1,470,502 and 1,470,503, 628,945 (Carlomagno), 650,918, 650,919, 650,920 and 663,014 (Batliwalla et al), and in the commonly assigned patent applications filed Mar. 14, 1985, by Ratell, Ser. Nos. 711,908 filed on Mar. 14, 1985, now U.S. Pat. No. 4,647,896 and 711,907 filed on Mar. 14, 1985 now U.S. Pat. No. 4,647,894 (MP1016 and MP1021), Carlomagno, Ser. No. 711,790 filed on Mar. 14, 1985, now U.S. Pat. No. 4,685,025 (MP0991), Au et al, Ser. No. 711,910 filed on Mar. 14, 1985, now U.S. Pat. No. 4,724,417 (MP1044), Deep et al, Ser. No. 711,909 filed on Mar. 14, 1985, now U.S. Pat. No. 4,774,024 (MP1022). The disclosure of each of the patents, publications and applications referred to above is incorporated herein by reference.

SUMMARY OF THE INVENTION

We have now discovered a way of utilizing many of the excellent properties of highly crystalline fluoropolymers in compositions which can be melt-shaped. In particular, we have found that it is possible to obtain melt-shapeable compositions by mixing two fluoropolymers, the first having a crystallinity of less than 45% and being melt-shapeable in the absence of other polymers (e.g. a copolymer of tetrafluoroethylene and hexafluoropropylene or a perfluorinated vinyl ether), and the second fluroropolymer having a crystallinity of at least 50% (e.g. irradiated PTFE); and that products obtained by melt-shaping such compositions have a valuable combination of properties derived from both fluoropolymers. Thus, the shaped products have tensile and elongation values which are at least adequate for many purposes, coupled with other valuable properties such as elevated melting point and low loss tangent.

We have also found that conductive polymer compositions comprising a mixture of two such fluoropolymers and, dispersed therein, a particulate conductive filler, especially carbon black, exhibit very valuable properties, and in particular can exhibit good PTC behavior with a high switching temperature, coupled with good physical properties.

In one aspect, the present invention provides a composition which can be melt-shaped and which comprises a mixture of a first fluoropolymer which has a crystallinity of less than 45% and which can be melt-shaped in the absence of other polymers, and a second cyrstalline fluoropolymer which has a crystallinity of at least 50%.

In another aspect, the invention provides a shaped article prepared by melt-shaping a composition as defined above.

In another aspect, the invention provides an electrical device which comprises (1) a PTC element which is composed of a PTC conductive polymer comprising a polymeric component comprising a composition as defined above and, dispersed therein, a particulate conductive filler, and (2) at least two electrodes which can be connected to a source of electrical to cause current to pass through the PTC element.

BRIEF DESCRIPTION OF THE DRAWING

The invention is illustrated in the accompanying drawings in which the FIGURE shows the resistivity/temperature characteristics of various compositions of the invention and of the prior art.

DETAILED DESCRIPTION OF THE INVENTION

The term "fluoropolymer" is used herein to denote a polymer which contains at least 10%, preferably at least 25%, by weight of fluorine, or a mixture of two or more such polymers. The term "perfluoropolymer" is used herein to denote a fluoropolymer in which all the substituents on the polymer backbone are fluorine atoms, or perfluoroalkyl or perfluoroalkoxy groups; the polymer backbone can consist of carbon atoms or can also contain hetero atoms, e.g. oxygen.

Melt viscosities given in this specification are measured at 380° C. at a shear rate of 100 sec$^{-1}$. Crystallinities given in this specification are measured using a differential scanning calorimeter (DSC).

The first fluoropolymer is preferably a crystalline fluoropolymer, particularly a perfluoropolymer, which can be melt-shaped in the absence of other polymers. Thus the first fluoropolymer will generally have a melt viscosity at 380° C. of less than $10^6$ poise, preferably less than $10^5$ poise, particularly less than $5 \times 10^4$ poise. The lower the melt viscosity, the easier the composition is to process, but (in general) the less desirble the properties of the final product. Accordingly, the melt viscosity of the first fluoropolymer is generally at least $10^3$ poise, particularly at least $1 \times 10^4$ poise, especially at least $2 \times 10^4$ poise. The first fluoropolymer is generally a homopolymer or copolymer of one or more fluorine containing olefinically unsaturated monomers, or a copolymer of one or more fluorine-containing olefinically unsaturated monomers and one or more olefins. The first fluoropolymer has a melting point of at least 150° C., often at least 250° C., e.g. up to 350° C., the melting point being defined as the temperature above which no crystallinity exists in the polymer (or when a mixture of crystalline polymers is used, in the major crystalline component in the mixture). Particularly preferred first fluoropolymers are copolymers of tetrafluoroethylene with one or more perfluorinated monomers, e.g. hexafluoropropylene or a perfluorinated vinyl ether; such copolymers are preferably perfluoropolymers but can contain small proportions of units derived from monomers which are only partially substituted by fluorine or which are free from fluorine. Commercially available fluoropolymers of this type include those sold by E.I. du Pont de Nemours under the trade names FEP-100, FEP-160, and PFA, such as those sold under the trade name PFA-340 AND PFA-350. Other polymers which can be used as the first fluoropolymer include copolymers of ethylene and tetrafluoroethylene and optionally one or more other comonomers (known as ETFE polymers), e.g. a copolymer comprising 35 to 60 mole percent of ethylene, 35 to 60 mole percent of tetrafluoroethylene and up to 10 mole percent of one or more other comonomers; copolymers of ethylene and chlorotrifluoroethylene; polyvinylidene fluoride; and copolymers of vinylidene fluoride with one or both of hexafluoropropylene and tetrafluoroethylene, or with hexafluoroisobutylene.

The first fluoropolymer has a crystallinity of less than 45%, preferably less than 30%, especially less than 20%. On the other hand, its crystallinity is preferably at least 5%, particularly at least 10%.

The second fluoropolymer is a crystalline fluoropolymer, preferably a perfluoropolymer, which has a crystallinity which is at least 50%, preferably at least 60%, especially at least 65%. The melt viscosity (at 380° C.) of the second fluoropolymer is generally less than $10^6$ poise, preferably less than $10^5$ poise, especially less than $2 \times 10^4$ poise. In many cases its melt viscosity (at 380° C.) is at least 10, particularly at least 100, especially at least 1000.

The invention is of particular value when the second fluoropolymer has been obtained by irradiating (e.g. with an electron beam) a fluoropolymer which, prior to irradiation, had a melt viscosity at least 3 times, preferably at least 10 times, particularly at least 100 times, that of the first fluoropolymer (the difference can be very much larger, e.g. by a factor of the order to $10^5$ or more). The second fluoropolymer can be (prior to irradiation) a melt-shapeable polymer, but the invention is particularly useful when the second polymer is one which, prior to irradiation, could not be melt-processed under practical conditions, because the invention makes it possible to utilize at least some of the valuable properties of such polymers while yet retaining the enormous advantages of melt-processing. Preferred second fluoropolymers are polymers of tetrafluoroethylene, in particular polytetrafluoroethylene (PTFE), for example that commercially available under the trade name Teflon from E.I. du Pont de Nemours. Surprisingly, the presence of the irradiated polymer does not have a substantial adverse effect on the processing characteristics of the first polymer, and can indeed substantially improve those characteristics. Thus the novel compositions have a melt viscosity which is preferably less than 1 time, especially less than 0.5 time, the melt viscosity of the first fluoropolymer. The irradiation will generally be carried out in the substantial absence of any radiation cross-linking agent, so that the predominant effect of the radiation is to degrade the fluoropolymer to a lower molecular weight, more brittle material. The radiation dose is preferably 2.5 to 40 Mrad, particularly 5 to 30 Mrad. The second fluoropolymer can be in the form of granules or any other form when it is irradiated.

The relative amounts of the first and second fluoropolymers can vary widely, depending primarily on the desired final product. Thus te ratio by weight of the first to the second fluoropolymer can be from 0.05:1 to 20:1. For many end uses, the preferred ratio is 0.3:1 to 2.5:1, particularly 0.3:1 to 1:1, e.g. 0.4:1 to 0.6:1. For many other end uses, particularly where the fluoropolymer composition comprises a conductive filler, the preferred ratio is 0.3:1 to 5:1, particularly 1:1 to 4:1, e.g. 2.5 to 1 to 3.5 to 1. The polymers can be blended in any convenient way, for example by physical blending of the polymers in the form of granules.

The compositions can contain, in addition to the first and second fluoropolymers, other ingredients which do not obviate the advantages provided by the fluoropolymers. Thus the compositions can contain non-polymeric ingredients, for example antioxidants, processing aids, acid acceptors, fire retardants and fillers (reinforcing or non-reinforcing), and/or relatively small quantities, e.g. up to 15%, preferably not more than 5%, by weight, of other polymers. When the composition is to be foamed, it can also contain a foaming agent and/or nucleating agent.

Particularly useful compositions are electrically conductive compositions which comprise a dispersion of one or more particulate conductive fillers, especially carbon black, in the mixture of first and second fluoropolymers. The electrical characteristics of such compositions depend upon the amount and type of the filler, and by following the teaching of the documents incorporated herein, by reference, a wide range of useful compositions can be obtained. Preferred compositions exhibit PTC behavior, and in such compositions the conductive filler preferably comprises a carbon black having a particle size D of 20 to 150 millimicrons and a surface area S in m²/gram such that S/D is not more than 10. The carbon black is preferably the sole conductive filler, but it can be mixed with another carbon black or other conductive filler, which preferably constitutes not more than 30%, particularly not more than 10%, by weight of the total conductive filler. Preferably the quantity $$\frac{S}{D} \times \frac{\text{volume of filler component}}{\text{volume of polymer component}}$$

is less than 1, where the filler component is the total of conductive and (if present) non-conductive fillers. The resistivity of the preferred PTC compositions at 23° C. depends upon the devices in which they are to be used, but is generally from 1 to $10^6$ ohm.cm, e.g. 1 to 100 ohm.cm for circuit protection devices and 100 to $10^5$ ohm.cm for self-limiting heaters, depending on the supply voltage. For further details of conductive fillers for use in the novel compositions and of devices in which such compositions can be employed, reference should be made to the documents incorporated herein by reference. The PTC compositions of the invention are particularly useful because they exhibit a very useful combination of good physical properties at high temperatures and good PTC behavior with a high switching temperature. This combination is useful for example in heaters and protection devices to be used in vehicles, e.g. in electrical harnessing systems for automobiles. For example in mixtures of PFA and irradiated PTFE, the PTFE greatly enhances the crystallinity (e.g. from about 26% to about 36%) and increases the height of the PTC anomaly (e.g. from about 5 decades to greater than 7 decades).

The circuit protection devices generally have a resistance of less than 100 ohms, usually less than 50 ohms, with the conductive polymer generally having a resistivity less than 100 ohm.cm, preferably less than 50 ohm.cm, particularly less than 10 ohm.cm.

The composition can be melt-shaped in any convenient way, including molding and melt-extrusion, which is generally preferred. The composition can be electrically conductive, as discussed above, or it can be electrically insulating, in which case it can provide the sole insulation over an electrical component, or it can provide one of two or more insulating jackets. The composition can be formed as part of the shaping operation, and this is particularly desirable when it is to provide insulation having low loss at high frequencies, for example the insulation in a coaxial cable transmitting high frequency electro-magnetic energy.

EXAMPLES

The invention is illustrated by the following Examples in which the various ingredients are further identified below.

FEP-100 and FEP-160 are high molecular weight copolymers of tetrafluoroethylene and hexafluoropropylene, available from du Pont.

PFA-340J and PFA-350 are high molecular weight copolymers of tetrafluoroethylene and a perfluorovinyl ether, also available from du Pont.

PTFE is high molecular weight polytetrafluoroethylene available under the trade name Teflon from du Pont.

PTFE (10 MR) is PTFE which has been irradiated to a dose of 10 Megarads.

PTFE (20 MR) is PTFE which has been irradiated to a dose of 20 Megarads.

PTFE (30 MR) is PTFE which has been irradiated to a dose of 30 Megarads.

PTFE (40 MR) is PTFE which has been irradiated to a dose of 40 Megarads.

EXAMPLES 1-10

Examples 1-10, in which Examples 1-5 are comparative Examples, are summarized in Table 1 below, the tensile strengths and elongations reported in the Table were measured by pulling a cylindrical rod in an Instron Tensile Testing Machine using an elongation rate of 2 inches/minute. The irradiated PTFE's were too brittle for their tensile strengths and elongations to be measured.

The crystallinities reported in the Table are calculated from measured heats of fusion, using a value of 22.2 calories/gram for 100% crystalline polymer.

The viscosities reported in the Table are measured (as discussed above) at 380° C. at a shear rate of 100 sec$^{-1}$ in a Rheometrics viscometer.

The Loss Tangents reported in the Table are measured at a frequency of 10 GHz.

The blends were prepared by dry-mixing the components, followed by melt-blending in a counter-rotating twin-screw extruder. Cylindrical rods for tensile testing were melt-shaped from the blends (or from the individual polymers) by extrusion through a cylindrical die at 380° C..

TABLE 1

| Example No. | Viscosity (poise) | Loss Tangent ($\times 10^4$) | Tensile (psi) | Elongation % | Tm (°C.) °C. | Crystallinity % |
| --- | --- | --- | --- | --- | --- | --- |
| 1. FEP-160 | $3.7 \times 10^4$ | 6.5 | 3000 | 300 | 268 | 11 |
| 2. PFA-350 | $5.0 \times 10^4$ | 11.0 | 4000 | 300 | 310 | 20 |
| 3. PTFE (10 MR) | $2.3 \times 10^4$ | — | 0 | 0 | 338 | 65 |
| 4. PTFE (20 MR) | $3.1 \times 10^3$ | — | 0 | 0 | 339 | 67 |
| 5. PTFE (30 MR) | $1.4 \times 10^3$ | — | 0 | 0 | 333 | 67 |
| 6. 50% PTFE (10 MR) 50% FEP-160 | $3.6 \times 10^4$ | 6.2 | 1990 | 45 | 330 | 29 |
| 7. 50% PTFE (20 MR) 50% FEP-160 | $2.6 \times 10^4$ | 6.2 | 2250 | 125 | 329 | 27 |
| 8. 50% PTFE (30 MR) 50% FEP-160 | $2.3 \times 10^4$ | 7.5 | 2098 | 225 | 329 | 27 |
| 9. 66% PTFE (30 MR) 34% FEP-160 | $8.7 \times 10^3$ | 5.9 | 1994 | 92 | 325 | 45 |
| 10. 40% PTFE (30 MR) 60% PFA-350 | $2.5 \times 10^4$ | — | 3100 | 370 | 322 | 30 |

EXAMPLES 11-14

Examples 11-14, in which Examples 11 and 12 are comparative Examples, are summarized in Table 2 below. The ingredients (and amounts thereof) listed in Table 2 were dried and mixed by adding the fillers to the molten polymer in a Brabender mixer. The mixture was cooled, granualted and compression molded into plaques, from which 1 by 1.5 inch samples were cut. Silver electrodes were painted onto the ends of the samples, and the resistance/temperature characteristics were determined by measuring the resistance of the samples as they were externally heated from 0° to 400° C. at a rate of 3.9° C./minute. The resistivities of the compositions were then calculated, and the results are presented graphically in the Figure, in which the flat portion at the top of one of the curves is produced by the maximum resistance which could be measured by the test apparatus.

The crystallinity was calculated from measured heats of fusion, using a value of 22.2 calories/gram for 100% crystalline polymer.

TABLE 2

| Example | Manufacturer | Volume % | | | |
| --- | --- | --- | --- | --- | --- |
| | | 11 | 12 | 13 | 14 |
| PFA Teflon PFA 340J | Du Pont | 68.0 | | 51.0 | |
| FEP Teflon FEP 100 | Du Pont | | 66.0 | | 49.5 |
| PTFE (40 MR) Teflon PTFE 7A | Du Pont | | | 17.0 | 16.5 |
| Carbon Black Statex G | Columbian Chemicals | 27.0 | 29.0 | 27.0 | 29.0 |
| ZnO Kadox 15 | Gulf & Western | 4.0 | 4.0 | 4.0 | 4.0 |
| Triallyl Isocyanurate | | 1.0 | 1.0 | 1.0 | 1.0 |
| Resistivity at 23° C. (ohm · cm) | | 3.72 | 3.38 | 3.12 | 2.64 |
| PTC anomaly height (decades) | | 4.99 | 3.50 | >7.48 | 4.63 |
| % Crystallinity | | 26.6 | 11.2 | 35.8 | 24.3 |

We claim:
1. An electrical device which comprises
(1) a melt-shaped conductive polymer element which comprises a polymeric component and, dispersed therein, a particulate conductive filler, said polymeric component comprising a mixture of
(A) a first fluoropolymer which has a crystallinity of less than 45% and which can be melt-shaped in the absence of other polymers, and
(B) a second crystalline fluoropolymer which is polytetrafluoroethylene and which has a crystallinity of at least 50%, and
(2) at least two electrodes which can be connected to a source of electrical power and which, when so connected, cause current to flow through the conductive polymer element.
2. A device according to claim 1 wherein the conductive polymer element exhibits PTC behavior.
3. A device according to claim 2 wherein the conductive polymer element has a resistivity at 23° C. of 1 to $10^6$ ohm.cm and comprises a carbon black having a particle size D of 20 to 150 millimicrons and a surface area S in m²/gram such that S/D is not more than 10.
4. A device according to claim 3 wherein the device is a circuit protection device having a resistance of less than 100 ohms and the conductive polymer element has a resistivity of less than 100 ohm.cm.
5. A device according to claim 2 wherein the first fluoropolymer has a melt viscosity at 380° C. of $5 \times 10^3$ to $1 \times 10^6$ poise, and the second fluoropolymer has a melt viscosity at 380° C. of less than $10^6$ poise and the ratio by weight of the first fluoropolymer to the second fluoropolymer is from 0.3:1 to 5:1.
6. A device according to claim 2 wherein the polymeric component comprises a mixture of
(1) a tetrafluoroethylene copolymer which is selected from (a) copolymers of tetrafluoroethylene and hexafluoropropylene and (b) copolymers of tetrafluoroethylene and a perfluorinated vinyl ether, and
(2) polytetrafluoroethylene which has been irradiated to a dose of 5 to 30 Mrad, the ratio by weight of polymer (1) to polymer (2) being from 0.3:1 to 5:1.
7. A device according to claim 1, wherein the first and second fluoropolymers constitute at least 85% by weight of the polymeric component.
8. A device according to claim 1, wherein the polytetrafluoroethylene has been irradiated to a dose of 2.5 to 40 Mrad.

* * * * *